(12) United States Patent
Wolf et al.

(10) Patent No.: US 11,677,283 B2
(45) Date of Patent: Jun. 13, 2023

(54) ELECTRIC MACHINE HAVING VIBRATION ATTENUATING STATOR LAMINATIONS

(71) Applicant: Ford Global Technologies, LLC, Dearborn, MI (US)

(72) Inventors: Christopher Wolf, Ann Arbor, MI (US); Franco Leonardi, Dearborn Heights, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 81 days.

(21) Appl. No.: 16/984,897

(22) Filed: Aug. 4, 2020

(65) Prior Publication Data

US 2022/0045560 A1 Feb. 10, 2022

(51) Int. Cl.
*H02K 1/18* (2006.01)
*H02K 5/24* (2006.01)

(52) U.S. Cl.
CPC .............. *H02K 1/185* (2013.01); *H02K 5/24* (2013.01)

(58) Field of Classification Search
CPC ............. H02K 5/24; H02K 1/20; H02K 1/185
USPC ................... 310/51, 216.015, 216.016, 52
See application file for complete search history.

(56) References Cited

U.S. PATENT DOCUMENTS

| 9,231,309 B2 | 1/2016 | Dede et al. |
| 2007/0071957 A1 | 3/2007 | Atkins et al. |
| 2018/0159387 A1 | 6/2018 | Boisson et al. |
| 2018/0367003 A1 * | 12/2018 | Rippel ..................... H02K 1/20 |

FOREIGN PATENT DOCUMENTS

| EP | 1515417 A2 * | 3/2005 | ............... H02K 1/20 |
| FR | 2975240 A1 * | 11/2012 | ............. H02K 1/185 |
| JP | 2007181292 A | 7/2007 | |
| JP | 110581611 A * | 11/2009 | |

OTHER PUBLICATIONS

FR-2975240-A1 (English translation) (Year: 2012).*
EP-1515417-A2 (English translation) (Year: 2005).*
CN-110581611-A (English Translation) (Year: 2019).*

\* cited by examiner

*Primary Examiner* — Ahmed Elnakib
*Assistant Examiner* — Minki Chang
(74) *Attorney, Agent, or Firm* — David B. Kelley; Brooks Kushman P.C.

(57) ABSTRACT

An electric machine includes a stator formed from a plurality of stacked laminations and defining a center bore and a rotor disposed within the center bore. The rotor is configured to output a rotational torque in response to an input current delivered to the stator. At least one of the stacked laminations of the stator includes a pattern of perforations disposed at a yoke portion of the stator to attenuate structure-bore transmission of vibration during operation of the electric machine.

16 Claims, 4 Drawing Sheets

ELECTRIC MACHINE HAVING VIBRATION ATTENUATING STATOR LAMINATIONS

TECHNICAL FIELD

This disclosure relates to the construction of electric machine components.

BACKGROUND

An automotive vehicle may include a battery to power an electric machine that is arranged to propel wheels of the vehicle. The electric machine may include a stator and rotor. The stator is typically stationary. Energy flows through the stator to or from the rotor. In an electric motor, the stator generates a rotating magnetic field that drives the rotating armature. While operating as a generator, the stator converts the rotating magnetic field of the rotor into electric current. In some cases, operation of the electric machine causes acoustic and vibratory emissions.

SUMMARY

An electric machine includes a stator formed from a plurality of stacked laminations and defining a center bore and a rotor disposed within the center bore. The rotor is configured to output a rotational torque in response to an input current delivered to the stator. At least one of the stacked laminations of the stator includes a pattern of perforations disposed at a yoke portion of the stator to attenuate structure-bore transmission of vibration during operation of the electric machine.

An electric machine includes a stator formed from a stack of laminations, and each of the laminations defines a pattern of perforations. The electric machine also includes a rotor disposed within a center bore of the stator that is configured to output a rotational torque in response to an input current delivered to the stator. The pattern of perforations of each of the laminations defines a series of patterned shapes disposed about a circumference of each lamination.

An electric machine includes a stator defining a center bore and configured to receive a current input. The stator also includes a first lamination defining a first pattern of perforations and a second lamination adjacent the first lamination that defines a second pattern of perforations. The electric machine also includes a rotor disposed within the center bore and configured to output a rotational torque in response to an input current delivered to the stator. The first pattern of perforations is misaligned relative to the second pattern of perforations to attenuate structure-bore transmission of vibration during operation of the electric machine.

DETAILED DESCRIPTION

Figure 1:
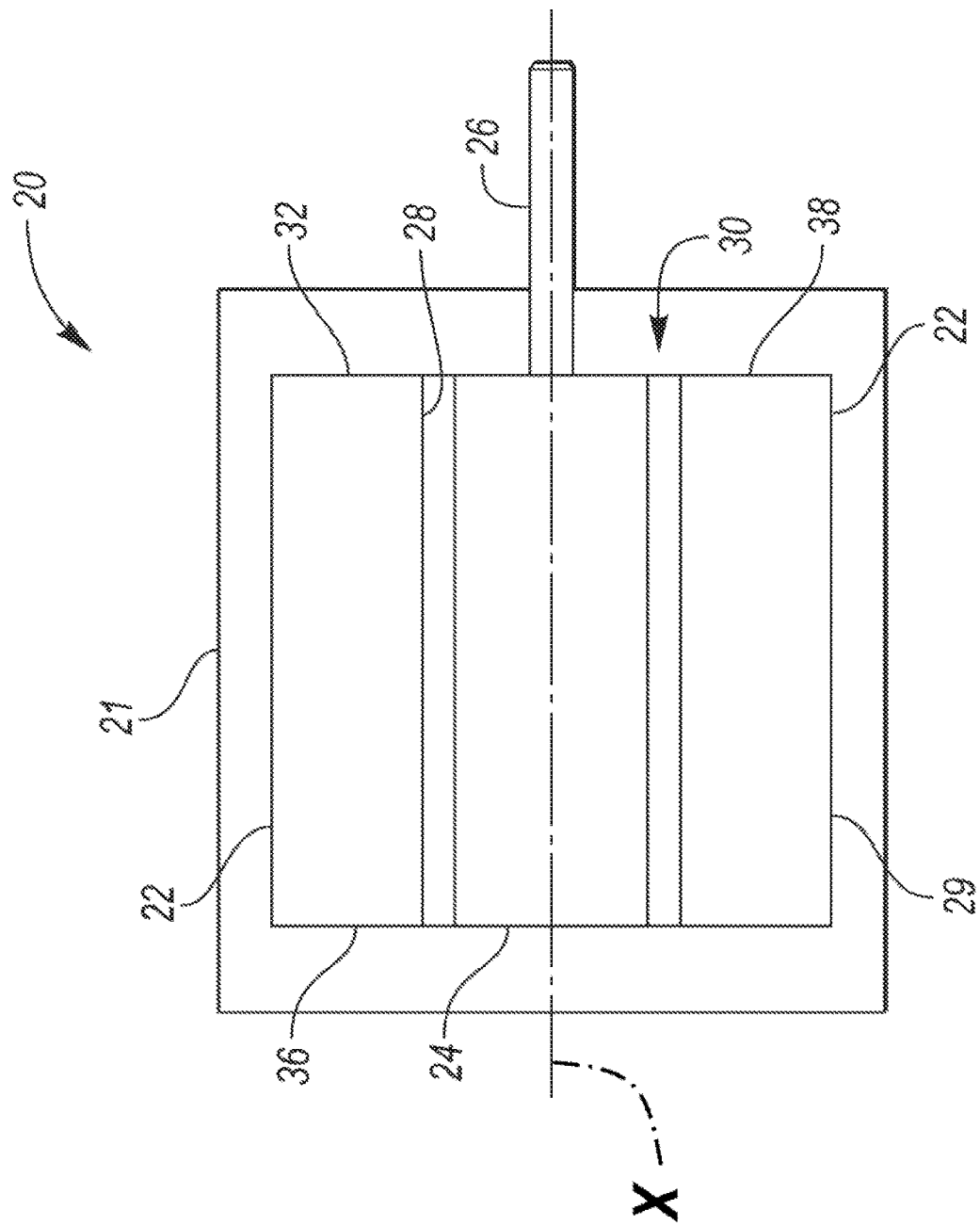
FIG. 1 is a schematic diagram of an electric machine.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machine efficiency requirements often demand that core material (electrical steel) be segmented to reduce eddy current loss during operation. A common approach is to create stator and rotor cores with thin laminations. The thickness is chosen as a compromise between cost, losses, and stacking factor. Thinner laminations result in more expensive cores, with lower losses, but also slightly lower torque capability because the insulation between the sheets takes proportionally more space with thinner laminations.

Low frequency noise may arise from operation of electric machines and generally carries a high penetrative power. More specifically, the structure-borne transmission of vibration through the stator into the motor housing can cause acoustic and vibratory emissions. Such noise and vibration emitted from a motor can cause annoyance to passengers and reduce the perception of quality of an electrified powertrain. A variety of techniques have been used to reduce noise, including the addition of insulating materials and/or isolators. Insulating materials follow the mass-density law for sound shielding, and certain materials may exhibit effective sound absorption in high frequency ranges. However, commonly such materials may be less effective in low frequency ranges (e.g., less than about 200 Hz). Increasing the thickness of dense materials often does not attenuate low frequency noise. As a result, thicker porous materials are commonly used for shielding low frequency noise. Moreover, low frequency sound absorbers work using resonance whereas porous absorbers operate as dissipative media.

According to aspects of the present disclosure, a stator having a composite structure may be provided to customize sound absorbing properties during motor operation. The individual laminations of the stator may be provided with tailored sound absorption properties. According to additional aspects of the present disclosure, a plurality of apertures is applied in a patterned fashion to selected individual stator laminations to influence vibration transmission. The apertures operate to attenuate structure-borne transmission of vibration through the stator by disrupting structure-borne vibration paths. At the same time, the structure maintains unbroken electromagnetic flux-paths through the stator. This configuration allows the stator sound transmission properties to be tunable, and local resonance may be influenced by adjusting the geometrical variables. In some examples the apertures are generally small and arranged in geometric patterns to obtain targeted vibration properties through the stator.

The present disclosure provides these and other solutions related to the stator lamination design in order to attenuate undesirable structure-borne transmission of vibrations.

Referring to FIG. 1, an electric machine 20 may be used in a vehicle equipped with an electric propulsion system, such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
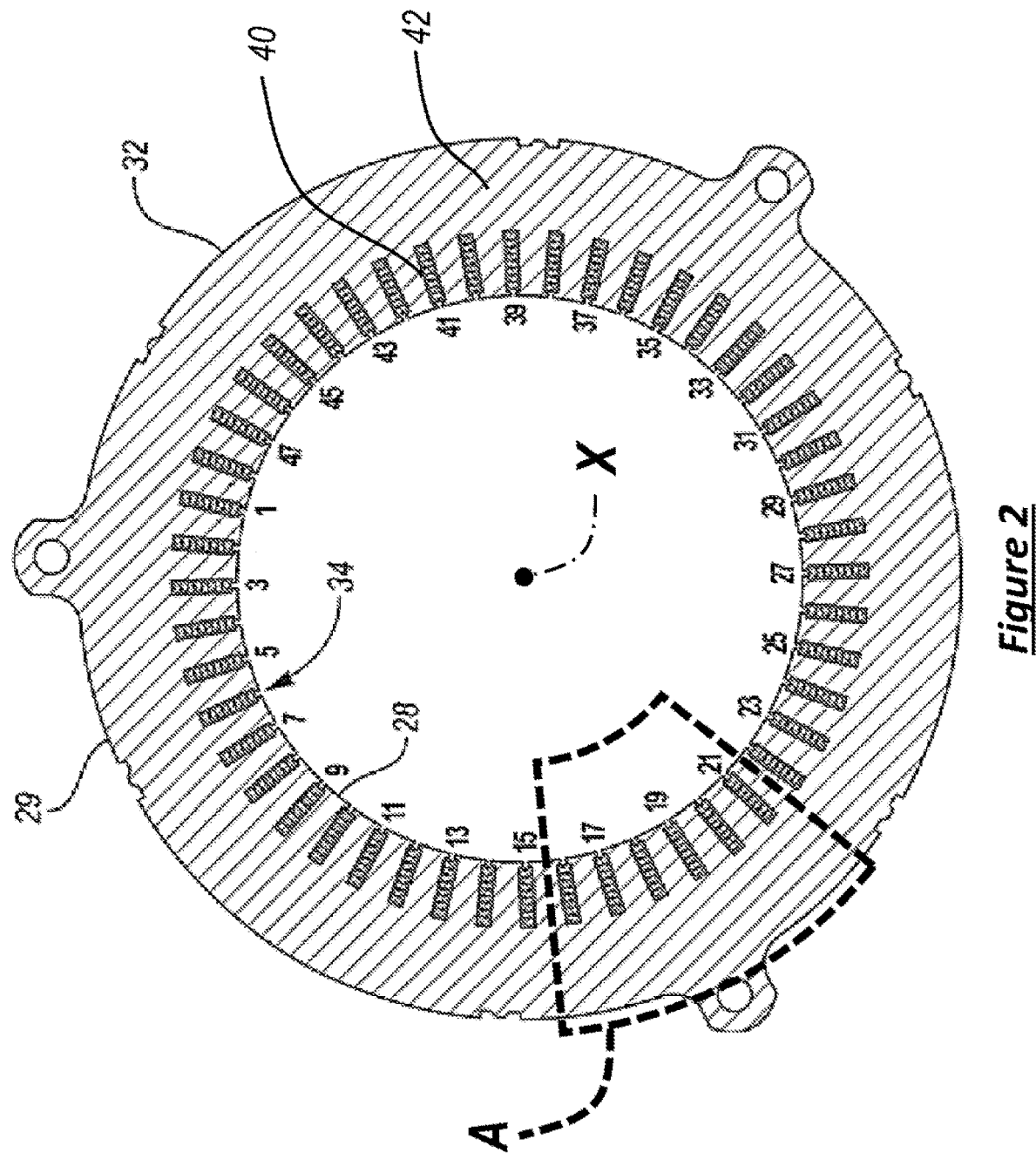
FIG. 2 is a cross-sectional end view of a stator of the electric machine.

Referring to FIGS. 1 and 2, the electric machine 20 includes a housing 21 that encloses the stator 22 and the rotor 24. The stator 22 is fixed to the housing 21 and includes a cylindrical stator core 32 having an inner diameter 28 that defines a hole 30 and an outer diameter 29. The stator core 32 may be formed from a plurality of stacked laminations. The rotor 24 is supported for rotation within the hole 30. The rotor 24 may include windings or permanent magnets (not shown) that interact with windings of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle and transmit torque about a central axis of rotation X.

The stator core 32 defines slots 34 circumferentially arranged around the stator core 32 and extending outward from the inner diameter 28. The slots 34 may be equally spaced around the circumference and extend axially from a first end 36 of the core 32 to a second end 38. In the example of FIG. 2, the core 32 defines forty-eight slots and has eight poles, but the core 32 may include more or fewer slots and/or poles in other examples. The odd-numbered slots are labeled in the view of FIG. 2 for illustration. In other examples, the core 32 may define seventy-two slots and have twelve poles. The slots 34 are spaced by a predetermined circumferential distance or "slot span," and allow for windings 40 to route longitudinally through the stator core and pass electrical current. Further, the slots 34 and windings 40 are positioned radially inward of a yoke portion 42 of the stator 32. The windings 40 define one or more paths that may correspond to an electrical phase. In some cases, windings 40 are conventional stranded windings made of long wires are connected in parallel, and a desired electrical phase configuration may be created by selecting the number of turns per coil, the number of parallel paths, the number of poles, the number of slots per pole, and the number of layers. In other examples, windings 40 are hairpin windings routed through the slots 34 of the stator core 32. Hairpin windings may yield an improved efficiency by providing a greater amount of stator conductors to reduce resistance of the windings 40 without encroaching into space reserved for the electrical steel and the magnetic flux path. In further examples, the electric machine 20 may be a double-layer machine meaning that some of the slots contain more than one electrical phase.

As discussed above, the stator 32 (and/or rotor 24) may be constructed from a series of thin laminations stamped from sheet material of uniform consistent thickness. In some examples, an insulating layer is interleaved between each of the stator laminations. The thickness of the laminations can be chosen as a compromise between cost, losses, and stacking factor. Thinner laminations may result in a more expensive stator core with lower electrical losses, but also provide less torque capability because insulation between each of the laminations takes proportionally more space relative to configurations having thicker laminations. In further examples, the laminations may be formed from other manufacturing techniques, such as additive manufacturing, where the laminations are formed by incrementally depositing of a number of passes of a flowable material combined to create the lamination.

Solutions described within the present disclosure include features in one or more laminations of the stator 32 that attenuate the structure-borne transmission of vibrations to the motor housing without causing significant reductions in the flux-carrying capability of the yoke portion 42 of the stator 32. According to some aspects, vibration attenuation features do not require any additional manufacturing steps beyond the original formation of each lamination of the stator 32 (e.g., stamping, additive manufacturing, etc.). Patterned regions of the stator laminations may be partially isolated from the main body of the stator yoke portion 42 by providing a plurality of material voids. These patterns and void shapes can be tuned to target specific ranges of frequencies and harmonic orders and optimized to reduce the impact on the permeance of the yoke portion 42 of the stator 32.

Figure 3:
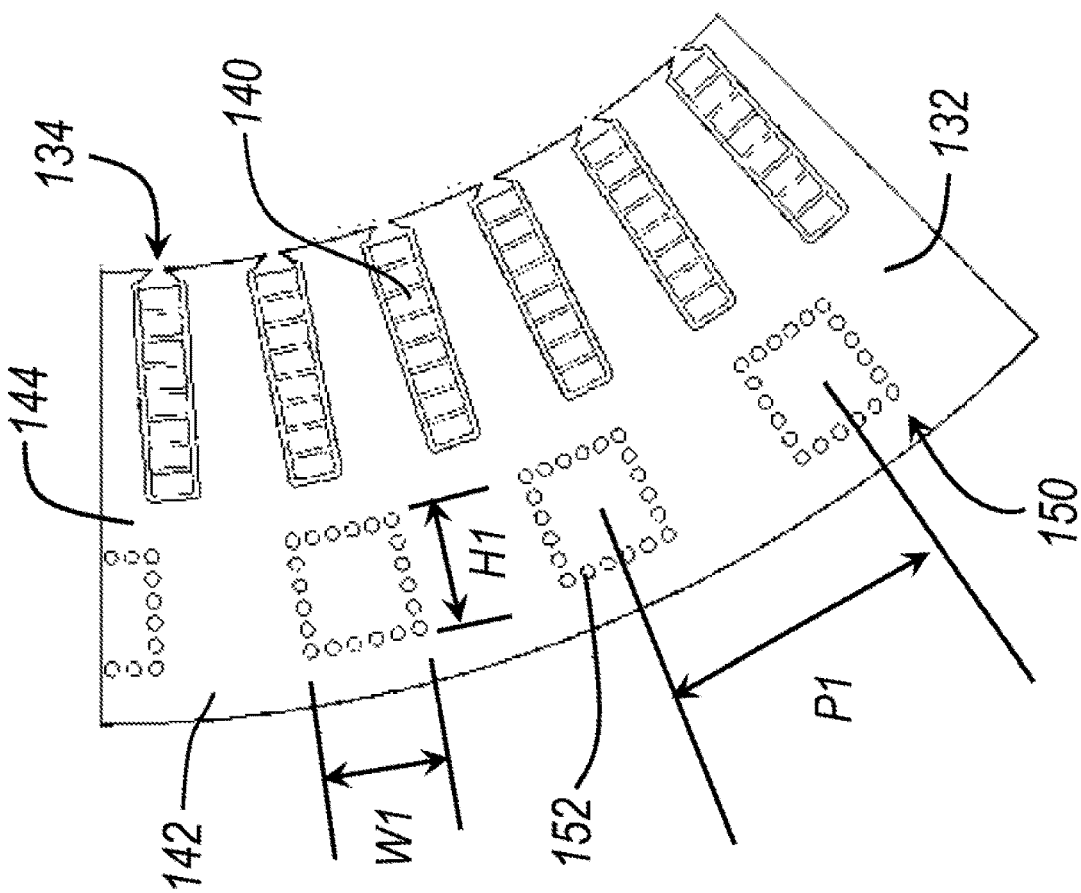
FIG. 3 is an end view of partial segment A of a vibration-attenuating stator lamination according to a first example.

Referring to FIG. 3, a view of partial segment A depicts a lamination 144 of an example stator 132 having mechanical isolation features 150 to attenuate vibrations. Where applicable, a similar reference numbering convention is applied that corresponds to similar components of previous examples, but with a difference in the hundreds digit. The mechanical isolation features 150 are provided as perforations 152 arranged in an of array rectangles. The individual perforations 152 are pierced through the lamination 144 of stator 132 and patterned in a single series of rectangular arrangements positioned in the yoke portion 142 of the stator 132 and radially outward of the slots 134 and windings 140.

According to the example of FIG. 3, each of the rectangular patterns are spaced with a pitch P1 about the circumference of the lamination 144 of stator 132. Each of the rectangles also defines a height H1 in a radial direction and a width W1 in a circumferential direction. The particular pattern of perforations may vary between individual laminations 144. More specifically, the patterns of perforations may vary across laminations such that adjacent laminations do no have the same patterns, and thus provide a different vibration response per lamination. Alternatively, the same pattern of perforations 152 may be used for all laminations 144 within a stack of the stator 132. It should be appreciated that the individual holes of the perforations 152, while depicted as circular holes, may also be with alternate shapes as desired, such as square holes (either with or without rounded corners), oval holes, rectangular holes, and various combinations thereof.

Figure 4:
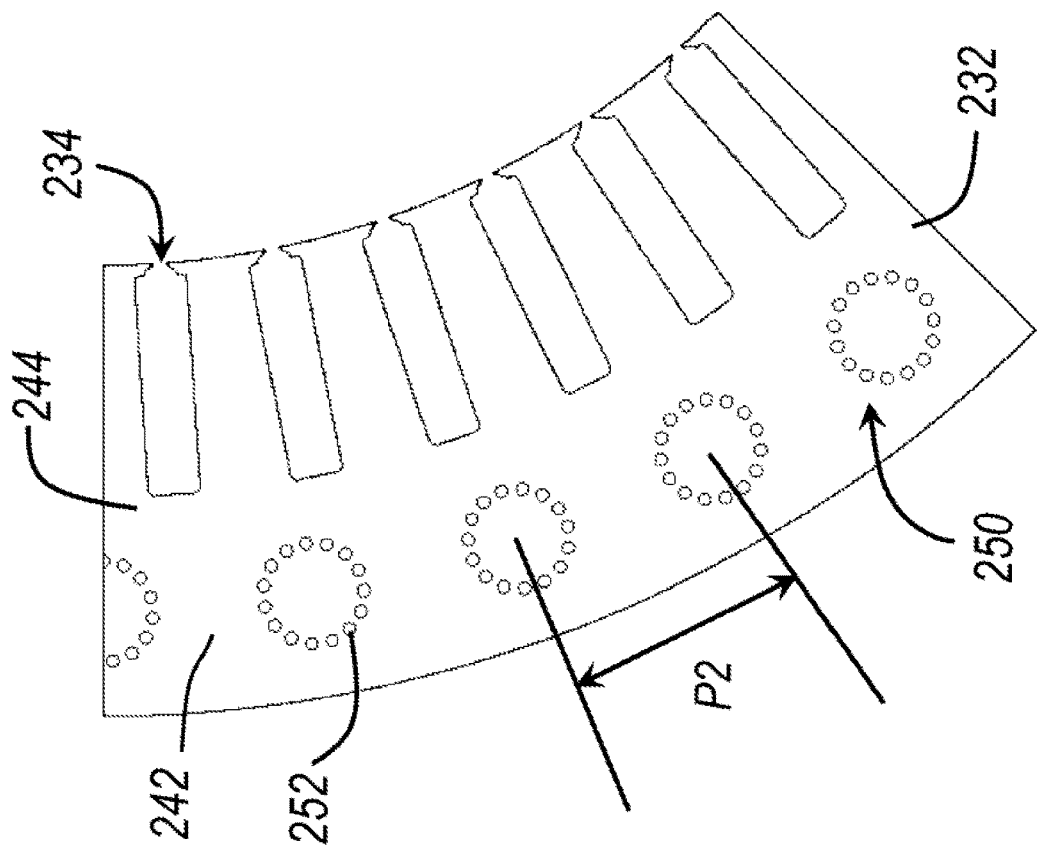
FIG. 4 is an end view of partial segment A of a vibration-attenuating stator lamination according to a second example.

Referring to FIG. 4, an end view of partial segment A depicts a lamination 244 of an additional example stator 232 having mechanical isolation features 250 to attenuate vibrations. Where applicable, a similar reference numbering convention is applied that corresponds to similar components of previous examples, but with a difference in the hundreds digit. In the example of FIG. 4, the mechanical isolation features 250 are provided as perforations 252 arranged in an of array circles. The individual perforations 252 are pierced through the lamination 244 of stator 232 and patterned in a single series of circular arrangements positioned in the yoke portion 242 of the stator 232 and radially outward of the slots 234 and windings (not shown) routed therein 140. According to some examples, the individual laminations 244 may be rotationally indexed about the axis of rotation X with respect to one another such that the pattern of perforations 252 of each of the laminations 244 do not align with adjacent laminations within the stack of stator 232.

Figure 5:
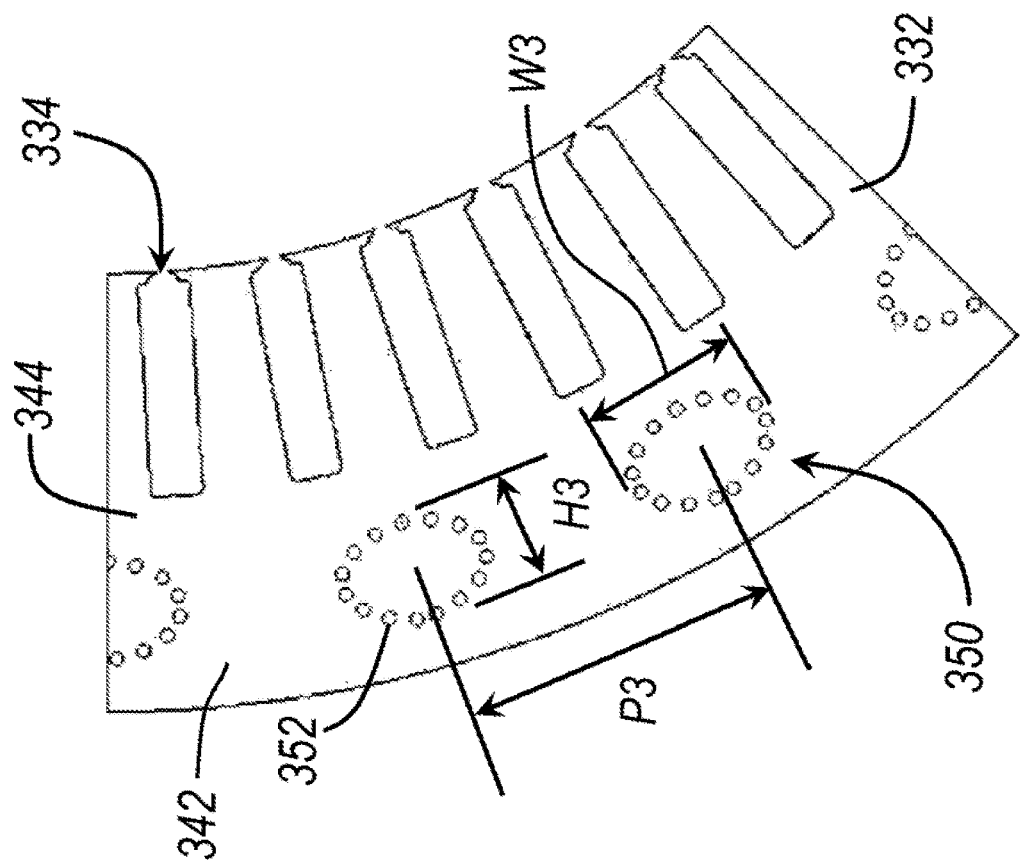
FIG. 5 is an end view of partial segment A of a vibration-attenuating stator lamination according to a third example.

Referring to FIG. 5, an end view of partial segment A depicts a lamination 344 of an additional example stator 332 having mechanical isolation features 350 to attenuate vibrations. Where applicable, a similar reference numbering convention is applied that corresponds to similar components of previous examples, but with a difference in the hundreds digit. In the example of FIG. 5, the mechanical isolation features 350 are provided as perforations 352 arranged in an of array ellipses. The individual perforations 352 are pierced through the lamination 244 of stator 232 and positioned in the yoke portion 342 of the stator 332 and radially outward of the slots 334 and windings (not shown) routed therein. According to the example of FIG. 5, each of the ellipse patterns are spaced with a pitch P3 about the circumference of the lamination 344 of stator 332. Each of the ellipses also defines a height H3 in a radial direction and a width W3 in a circumferential direction. According to some alternative examples, the size and/or positions of adjacent ellipses varies about the circumference of the lamination 344 of stator 332. So long as the rotational balance of the electrical machine is maintained, various alternating patterns of perforation 352 may be employed about the circumference.

Figure 6:
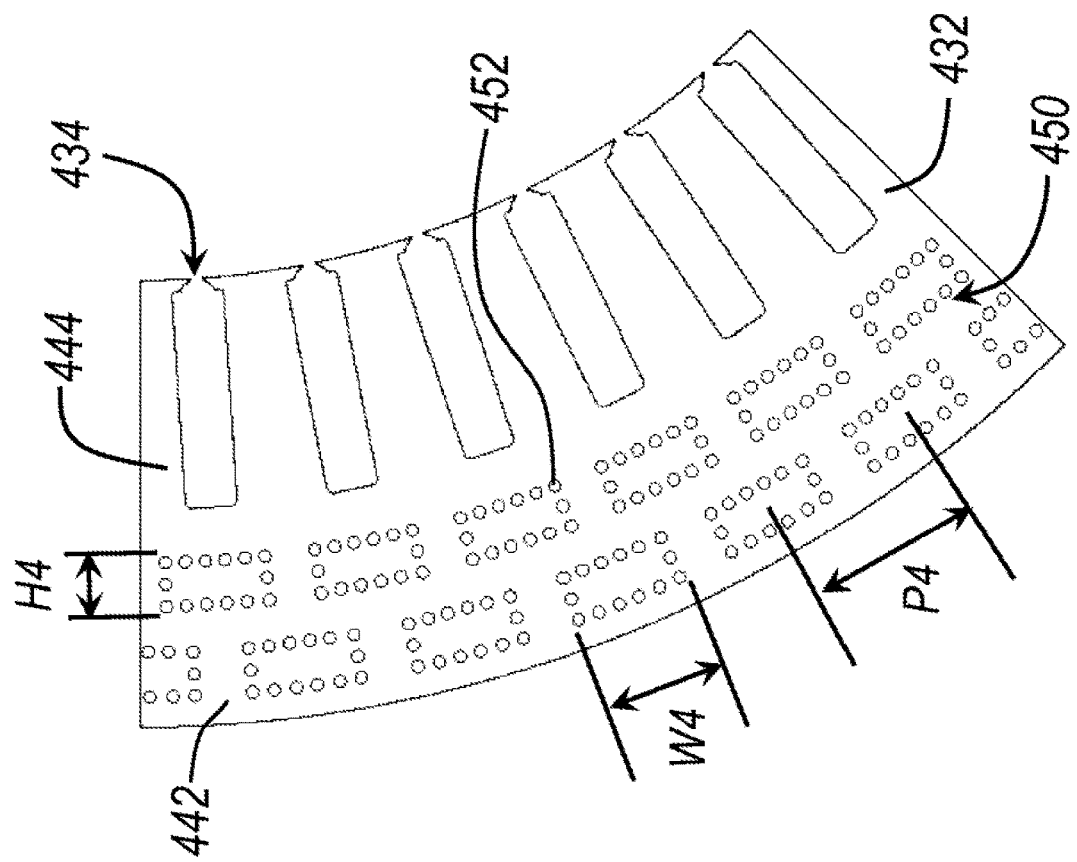
FIG. 6 is an end view of partial segment A of a vibration-attenuating stator lamination according to a fourth example.

Referring to FIG. 6, an end view of partial segment A depicts a lamination 444 of an additional example stator 432 having mechanical isolation features 450 to attenuate vibrations. Where applicable, a similar reference numbering convention is applied that corresponds to similar components of previous examples, but with a difference in the hundreds digit. In the example of FIG. 6, the mechanical isolation features 450 are provided as perforations 452 arranged in an of array rectangles. The individual perforations 452 are pierced through the lamination 444 of stator 432 and positioned in the yoke portion 442 of the stator 432 and radially outward of the slots 434 and windings (not shown) routed therein. The array of rectangles may include two rows of rectangles where a first row of rectangles is spaced radially outward of a second row of rectangles. Additionally, each of the first row of rectangles and the second row of rectangles may be rotationally indexed with respect to one another such that the rectangles of each individual row are angularly misaligned relative to the axis of rotation X. According to the example of FIG. 6, each of the rectangle patterns are spaced with a pitch P4 about the circumference of the lamination 444 of stator 432. Each of the rectangles also defines a height H4 in a radial direction and a width W4 in a circumferential direction. Similar to previous examples, the size and pitch of individual patterns of perforations may vary about the circumference of the stator 432.

Design features to attenuate the structure-borne transmission of vibrations through the stator are described herein. While the patterns and hole shapes shown are specific examples, one generic form of the solution of the present disclosure includes patterns of voids in individual stator laminations that create partial mechanical isolation of an array of sections in the stator yoke. Examples of the present disclosure help reduce vibration attenuation while having minimal impact to the flux-carrying capability of the stator yoke. Moreover, the examples of the present disclosure provide design freedom to tune the void shapes, sizes, and patterns for targeted vibration attenuation. In further examples irregular patterns and/or hole shapes may be implemented as a result of topological simulations. As a result, the vibratory impact of the electric machine can be decreased with little or no increase in manufacturing cost. Additionally, the aspects of the present disclosure may provide a decrease in weight of the electric machine.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
    a stator formed from a plurality of stacked laminations and defining a center bore; and
    a rotor disposed within the center bore and configured to output a rotational torque in response to an input current delivered to the stator, wherein at least one of the stacked laminations of the stator includes a pattern of perforations disposed at a yoke portion of the stator to attenuate structure-bore transmission of vibration during operation of the electric machine, wherein the pattern of perforations comprises multiple groups of perforations arranged circumferentially about the rotor and wherein each of the groups of perforations outline a discrete rectangle, triangle, circle, or ellipse spaced away from other of the groups.

2. The electric machine of claim 1, wherein the pattern of perforations of a first lamination of the stacked laminations is misaligned with respect to adjacent laminations of the stacked laminations.

3. The electric machine of claim 2, wherein the first lamination is rotationally indexed with respect to adjacent laminations of the plurality of stacked laminations.

4. The electric machine of claim 2 wherein the first lamination defines a first pattern of perforations that is different from a second pattern of perforations defined by adjacent laminations of the stacked laminations.

5. The electric machine of claim 1, wherein individual holes of the pattern of perforations are configured as at least one of a circular hole, a rectangular hole, a triangular hole, and an oblong hole.

6. The electric machine of claim 1, wherein the pattern of perforations defines a first row of perforation shapes located radially outward of a second row of perforation shapes.

7. The electric machine of claim 6, wherein the first row of perforation shapes is rotationally indexed relative to the second row of shapes such that the perforation shapes of each individual row are angularly misaligned relative to an axis of rotation of the electric machine.

8. An electric machine comprising:
a stator formed from a stack of laminations, each of the laminations defining a pattern of perforations that comprises multiple groups of perforations arranged circumferentially about the lamination and wherein each of the groups of perforations outlines a discrete rectangle, triangle, circle, or ellipse spaced away from other of the groups; and
a rotor disposed within a center bore of the stator and configured to output a rotational torque in response to an input current delivered to the stator.

9. The electric machine of claim 8, wherein the pattern of a first lamination of the stack of laminations is misaligned with respect to adjacent laminations of the stack of laminations.

10. The electric machine of claim 8, wherein a first lamination is rotationally indexed with respect to adjacent laminations of the stack of laminations.

11. The electric machine of claim 8, wherein individual holes of the pattern of perforations are configured as at least one of a circular hole, a rectangular hole, a triangular hole, an oblong hole.

12. An electric machine comprising:
a stator defining a center bore and configured to receive a current input, the stator including
a first lamination defining a first pattern of perforations, and
a second lamination adjacent the first lamination and defining a second pattern of perforations; and
a rotor disposed within the center bore and configured to output a rotational torque in response to an input current delivered to the stator, wherein the first pattern of perforations is misaligned relative to the second pattern of perforations to attenuate structure-bore transmission of vibration during operation of the electric machine and wherein the first pattern of perforations comprises multiple groups of perforations arranged circumferentially about the rotor and wherein each of the groups of perforations outlines a discrete rectangle, triangle, circle, or ellipse spaced away from other of the groups.

13. The electric machine of claim 12, wherein individual holes of each of the first pattern and second pattern of perforations are configured as at least one of a circular hole, a rectangular hole, a triangular hole, an oblong hole.

14. The electric machine of claim 12, wherein first lamination is rotationally indexed with respect to the second lamination.

15. The electric machine of claim 12, wherein at least one of the first pattern and second pattern of perforations defines a first row of perforation shapes located radially outward of a second row of perforation shapes.

16. The electric machine of claim 15, the first row of perforation shapes is rotationally indexed relative to the second row of shapes such that the perforation shapes of each individual row are angularly misaligned relative to an axis of rotation of the electric machine.

* * * * *